United States Patent [19]

Bruning et al.

[11] Patent Number: 4,657,944

[45] Date of Patent: Apr. 14, 1987

[54] CO$_2$-INDUCED IN-SITU GELATION OF POLYMERIC VISCOSIFIERS FOR PERMEABILITY CONTRAST CORRECTION

[75] Inventors: Donald D. Bruning, Houston; Donald R. Weir, Borger, both of Tex.

[73] Assignee: Phillips Petroleum Company, Bartlesville, Okla.

[21] Appl. No.: 805,519

[22] Filed: Dec. 6, 1985

Related U.S. Application Data

[62] Division of Ser. No. 578,393, Feb. 9, 1984, Pat. No. 4,569,393.

[51] Int. Cl.$^4$ .................................................. C09K 7/00
[52] U.S. Cl. ..................................... 523/130; 524/127; 524/206; 524/424
[58] Field of Search ................ 523/130; 524/127, 206, 524/424

[56] References Cited

U.S. PATENT DOCUMENTS

| | | | |
|---|---|---|---|
| 2,573,738 | 11/1951 | Smith et al. | 424/131 |
| 3,386,509 | 6/1968 | Froning | 166/29 |
| 3,679,000 | 7/1972 | Kaufman | 166/273 |
| 3,699,042 | 10/1972 | Browning et al. | 252/8.5 C |
| 3,727,688 | 4/1973 | Clampitt | 166/283 |
| 3,727,689 | 4/1973 | Clampitt | 166/283 |
| 3,741,894 | 6/1973 | Storfer | 252/8.5 C |
| 3,749,172 | 7/1973 | Hessert et al. | 166/274 |
| 3,753,971 | 8/1973 | Browning et al. | 530/506 |
| 3,762,476 | 10/1973 | Gall | 166/294 |
| 3,768,565 | 10/1973 | Persinski et al. | 166/308 |
| 3,782,467 | 1/1974 | Hessert | 166/261 |
| 3,785,437 | 1/1974 | Clampitt et al. | 166/281 |
| 3,795,276 | 3/1974 | Eilers et al. | 166/295 |
| 3,815,681 | 6/1974 | Richardson | 166/281 |
| 3,845,822 | 11/1974 | Clampitt et al. | 166/281 |
| 3,909,423 | 9/1975 | Hessert et al. | 252/8.55 D |
| 3,926,258 | 12/1975 | Hessert et al. | 166/294 |
| 3,952,806 | 4/1976 | Trantham | 166/294 |
| 3,955,998 | 5/1976 | Clampitt et al. | 106/193 R |
| 3,978,928 | 9/1976 | Clampitt | 166/294 |
| 4,018,286 | 4/1977 | Gall et al. | 166/295 |
| 4,026,361 | 5/1977 | Knapp et al. | 166/281 |
| 4,040,484 | 8/1977 | Hessert | 166/294 |
| 4,055,502 | 10/1977 | Swanson | 252/8.55 C |
| 4,068,714 | 1/1978 | Clampitt et al. | 166/246 |
| 4,068,719 | 1/1978 | Clampitt et al. | 166/282 |
| 4,068,720 | 1/1978 | Hessert et al. | 166/282 |
| 4,103,742 | 8/1978 | Swanson | 166/282 |
| 4,110,130 | 8/1978 | Hessert et al. | 252/8.55 R |
| 4,129,361 | 10/1978 | Threlkeld et al. | 166/295 |
| 4,146,486 | 3/1979 | Hessert et al. | 252/8.55 C |
| 4,169,797 | 10/1979 | Johnson, Jr. et al. | 252/8.55 C |
| 4,172,041 | 10/1979 | Clampitt et al. | 252/8.55 C |
| 4,191,657 | 3/1980 | Swanson | 252/8.55 C |
| 4,290,485 | 9/1981 | Free et al. | 166/295 |
| 4,296,811 | 10/1981 | Morris et al. | 166/273 |

OTHER PUBLICATIONS

46 C.A. 6792c (1976).
Mellor, *A Comprehensive Treatise on Inorganic and Theoretical Chemistry* XI, 284–5 (Longman, London 1931).

*Primary Examiner*—Joseph L. Schofer
*Assistant Examiner*—N. Sarofim
*Attorney, Agent, or Firm*—J. E. Phillips

[57] ABSTRACT

A water permeability contrast correction process to improve the sweep efficiency of waterflooding which involves the sequential injection of (1) an optional aqueous preflush slug to adjust connate water salinity, (2) an aqueous thickened slug comprising a sequestered polyvalent metal cation such as aluminum citrate and a gelable polymeric viscosifier such as polyacrylamide, (3) carbon dioxide to decrease the pH of the polymer slug which triggers the delayed in-situ gelation of said thickened slug to preferentially decrease water permeability in highly permeable thief zones, and (4) an aqueous drive fluid.

10 Claims, 5 Drawing Figures

ALUMINUM CITRATE/POLYACRYLAMIDE GELLING RANGE
AS A FUNCTION OF THE PH OF THE SOLUTION

FIG. 5

CO₂-INDUCED IN-SITU GELATION OF POLYMERIC VISCOSIFIERS FOR PERMEABILITY CONTRAST CORRECTION

This is a divisional application of Ser. No. 578,393, filed Feb. 9, 1984, now U.S. Pat. No. 4,569,393.

The invention pertains to a method for correcting the water permeability contrast of heterogeneous subterranean formations. In one aspect, the invention pertains to permeability contrast correction of underground strata. In a particular aspect, the invention pertains to the selective plugging of more permeable strata of subterranean formations by the injection therein of gelable aqueous polymer solutions followed by the injection of a gel-triggering gaseous component to effect in-situ gelation. In another aspect, the invention pertains to the creation of gel plugs in subterranean formations under controlled conditions. In a further aspect, the invention pertains to methods of waterflooding.

BACKGROUND OF THE INVENTION

Methods of water diversion employed in waterflooding depend in part on the degree of heterogeneity of the porous media or strata being treated. Relatively more permeable zones of the subterranean formation tend to take most of the injected fluids. Initially, this is acceptable in sweeping oil from such zones of relatively high permeability. However, this subsequently becomes undesirable as the oil content of such strata becomes depleted since much of the subsequently injected flood water or other fluid by-passes the relatively less permeable but oil-bearing zones and provides little benefit in enhancing further hydrocarbon recovery.

An isolated high-permeability zone or fracture can be plugged at the well core face by a shallow layer of applied cement, though such a permanent relatively irrevocable technique often is considered undesirable. More desirably, a communicating high-permeability zone preferably is plugged to some considerable outward lateral depth to be most effective in preventing floodwater or gas from otherwise merely flowing around a narrow shallow plug and back into the high-permeability or swept zone. In depth plugging of a relatively high-permeability zone converts the zone into a zone of much lower permeability. Subsequently injected floodwater or other fluid then will tend to enter formerly by-passed but now relatively more-permeable hydrocarbon-bearing zones and thus mobilize increased amounts of hydrocarbons therefrom.

In depth plugging can be effected by the injection of gelable thickened aqueous solutions containing sequestered polyvalent metal cations which cause the gelation or crosslinking of the thickened aqueous solutions when the pH of the solution is in a gelation pH range.

The injection of gelable systems triggered by a following aqueous acidic solution for in-situ pH adjustment has been used. However, this sequence may result in gelation occurring so rapidly and shallowly that a sufficient lateral outward depth of plugging is not effectively obtained in the most permeable strata where needed. On the other hand, when the acidic component is premixed with the gelable composition, gelation also can be too swift, resulting in the necessity of shearing the gelled polymer in order to be able to obtain adequate injection, but which reduces the effectiveness of the gel.

Needed is a method of in-situ gelling a gelable injectable aqueous liquid composition which has an initial pH outside the gelation pH range yet which possesses the capability of forming the desired gel in-situ, and without the need for premixing with acid or the follow-up injection of acid.

BRIEF DESCRIPTION OF THE INVENTION

We have discovered an in-situ gelling method employing the injection of carbon dioxide subsequent to the injection of a gelable composition into a subterranean formation. The carbon dioxide slug adjusts the pH of the gelable composition into a pH range effective for in-situ gelation to take place. The compositions employed comprise water, a water-thickening amount of a polymer capable of gelling in the presence of a crosslinking agent, and a suitable amount of crosslinking agent capable of gelling the polymer. The subsequently injected effective amount of carbon dioxide triggers the in-situ gelation of the gelable compositions.

The components, other than the carbon dioxide, are admixed in a liquid state at a pH above the gelation pH range, thus in a non-gelled state. After the injected composition has penetrated into an underground formation and positioned itself, gelation is triggered in-situ by the fingering of the very highly mobile carbon dioxide which tends to flow preferentially into the highly permeable strata so as to reduce the pH therein into the gelation pH range, thereby effecting in depth plugging of the strata with the now-gelled gelable composition.

While some preferential placement of the pre-gel material occurs due to the contrast of permeability between the high and low permeability streaks, the relatively high viscosity of some of the pre-gel aqueous injection material tends to lead in some instances to a more uniform penetration than desired. Only fractures and extremely high permeability streaks will show significant preferential filling. This is true of most of the bulk gelling systems since they usually involve injection of relatively viscous materials.

The primary feature of our invention which results in better placement selectivity than all liquid systems is the use of the gas phase trigger. The gas has a very low viscosity which gives it a great tendency to finger through the more permeable streaks, even when there is a relatively small permeability contrast. With the high fingering tendency of our triggering material, gel forms only where the gas goes, which is precisely where it is needed.

The ungelled polymer in the low permeability zones then is displaced by the following flood waters. Some of this pre-gel material is displaced back into the high permeability streak beyond the gel plug and is gelled there because of the lower pH remaining from the effects of the previous $CO_2$ flush. A second factor in gel placement with gas is the tendency for the gas slug to push some polymer solution ahead of it as it fingers through the high permeability streak.

In a water permeability contrast correction process (sometimes termed in previous disclosures water permeability correction process) to improve the sweep efficiency of waterflooding operations, the following sequence of injections is used: (1) an optional aqueous preflush slug to adjust connate water salinity; (2) a thickened aqueous slug comprising a sequestered polyvalent metal cation, such as aluminum citrate, and a gelable polymeric viscosifier, such as partially hydrolyzed polyacrylamide; (3) carbon dioxide in amounts suitable for decreasing the pH of the previously injected thickened aqueous slug (2) so as to trigger the in-situ gelation of the thickened slug, thus effecting preferential decrease in water permeability of the highly permeable thief zones; and (4) an aqueous drive fluid.

Our process has the advantage of employing an aqueous composition which itself is non-acidic and uses non-acidic materials which are relatively easily handled and stored. The aqueous admixtures for injection are at an initial pH above about 7.5, thus they are relatively non-corrosive and easily handled without effecting or causing undue deterioration of pipeline, pumps, casings, and the like.

Our invention provides a method for the in-situ plugging of high permeability zones in hydrocarbon bearing formations. A non-acidic thickened aqueous slug containing complexed polyvalent metal crosslinking agent at an alkaline pH is injected into a heterogeneous formation. This slug has the tendency to flow predominantly into the high permeability zones. Thereafter, carbon dioxide, or carbon dioxide mixed with other gases, is injected and fingers its way spontaneously into the high permeability zones to contact the previously injected thickened aqueous slug. Prior to the arrival of the carbon dioxide in these zones, the thickened aqueous slug remains ungelled. After injection of the carbon dioxide into the formation, some of the carbon dioxide dissolves in the reservoir brine and in the thickened aqueous slug, thereby lowering the pH of the thickened aqueous slug sufficiently to activate the in-situ gelation of the slug by the sequestered polyvalent metal crosslinking agent. This method, of our invention, allows the thickened aqueous slug to be placed far out into the subterranean formation before gelation is initiated by the $CO_2$ described pH-adjustment technique. The highly mobile gaseous $CO_2$ channels very rapidly into the highly permeable zones and therein triggers gelation by lowering the pH in the body of the previously injected gelable composition.

It is an object of our invention to provide an in depth permeability contrast correction method for plugging the more permeable strata in subterranean formations. It is also an object of our invention to provide a method for treating an underground formation in which the plugging is delayed by controlling the pH of the injected liquids until the fluids have been positioned deep within the heart of the permeable underground formation. It is a further object of our invention to provide a method for employing gelable injectable liquid compositions which have a pH outside the gelation pH range yet possess the capability of forming the desirable gels in-situ when contacted by a following injection of carbon dioxide as a gel-triggering reagent.

Other aspects, objects, and the various advantages of this invention will become apparent upon reading this specification and the appended claims.

BRIEF DESCRIPTION OF THE DRAWING

(A) Initially less permeable stratum is shown 11, and initially more permeable stratum 12. The pre-gel, aqueous gelable admixture 13 moves into the several strata 11, 12, forming a front 14.

(B) Upon $CO_2$ injection 15, acidification and gelation 16 occurs only in the initially more permeable strata 12 since the $CO_2$ fingers most readily therethrough.

(C) Floodwater 17 then is applied, and some pre-gel in the ungelled strata 11 is pushed along, and some likely tends to pass plug 16 and wash 18 into the zone of more permeability, meeting low pH aqueous $CO_2$ 19.

(D) The above effect is to form a further gel plug 21 extent.

FIG. 3 illustrates the same simulated sand pack as in FIG. 2, but reflects the effects of our $CO_2$ in-situ gelation treatment. The gel 4 formed in the initially more permeable coarse core (1), effectively making it now less permeable, such that following flood water (arrows 3) now moves through the formerly less permeable but now more permeable fine beads (2).

DETAILED DESCRIPTION OF THE INVENTION

In accordance with our invention, the injection of the gelable composition is followed by the injection of an effective pH-adjusting (pH-lowering) amount of carbon dioxide. The gelable composition comprises water, a water-thickening amount of a water-soluble or water-dispersible polymeric viscosifier, and a polyvalent metal cation crosslinking agent. The pH of the injected composition is adjustable in-situ. The carbon dioxide under the conditions of temperature and pressure of the underground strata reduces the pH of the injected aqueous composition into the gelation range, thus triggering the in-situ gelation of the injected aqueous gelable composition.

In one embodiment of our invention, a plug is created in an underground formation by injecting into the formation an admixture comprising water, a gelable polymer, and a crosslinking agent, with an admixture pH outside the gelation range, followed by carbon dioxide which fingers preferentially into the highly permeable strata and therein reduces the pH of the injected admixture into the gelation range, thereby triggering in-situ gelation of the placed admixture.

POLYMERS

Polymers suitable for use in our invention are those capable of gelling in the presence of polyvalent metal ion crosslinking agents within a gelation pH range. Suitable polymers include biopolysaccharides, cellulose ethers, and acrylamide-based polymers.

Suitable cellulose ethers are disclosed in U.S. Pat. No. 3,727,688 (incorporated herein by reference). Particularly preferred cellulose ethers include carboxymethylhydroxyethyl cellulose (CMHEC) and carboxymethyl cellulose (CMC).

Suitable biopolysaccharides are disclosed in U.S. Pat. No. 4,068,714 (incorporated herein by reference). Particularly preferred is polysaccharide B-1459 which is a biopolysaccharide produced by the action of *Xanthomo-*

*nas campestris* bacteria. This biopolysaccharide is commercially available in various grades under the trademark Kelzan TM (Kelco Company, Los Angeles, Calif.

Suitable acrylamide-based polymers are disclosed in U.S. Pat. No. 3,749,172 (incorporated herein by reference). Particularly preferred are the so-termed partially hydrolyzed polyacrylamides possessing pendant carboxylate groups through which crosslinking can take place. Thermally stable copolymers of acrylamide, such as poly(N-vinyl-2-pyrrolidone-co-acrylamide) and poly(sodium-2-acrylamido-2-methyl-1-propanesulfonate-co-acrylamide), are particularly suitable for applications in high salinity environments at elevated temperatures. Various terpolymers also are useful in the present process, such as terpolymers derived from acrylamide and N-vinyl-2-pyrrolidone comonomers with lesser amounts of termonomers such as vinyl acetate, vinylpyridine, styrene, methyl methacrylate, and the like.

Other miscellaneous polymers suitable for use in the present invention include partially hydrolyzed polyacrylonitriles, polystyrene sulfonates, lignosulfonates, methylolated polyacrylamides, and the like.

In general, the gelation pH range is within a pH range of about 3 to 7. It is recognized that this range may vary somewhat for various polymers, or for polymer-polyvalent metal cation combinations or concentration relationships. The specific gelation pH range is readily determinable for a given or specific polymer or polymer-polyvalent metal cation combination by testing same with additions of acid and following the resulting pH change until gelation is observed.

Presently preferred are the acrylamide based polymers, particularly the polyacrylamides and the partially hydrolyzed polyacrylamides, preferably in conjunction with $Al^{3+}$ as the polyvalent metal cation, presently most preferably as the aluminum citrate complex.

The concentration or water-thickening amount of the water-soluble/dispersible polymer in the aqueous solution/dispersion can range widely and be as suitable and convenient for the various polymers, and for the degree of gelation needed for particular strata. Generally, the concentration of polymer in its aqueous solution/dispersion (before admixing with components) is about 1,000 to 20,000 ppm, preferably about 2,000 to 5,000 ppm.

Any suitable procedures for preparing the aqueous admixtures of the crosslinkable polymer can be used. Some polymers may require particular mixing conditions, such as slow addition of finely powdered polymer into the vortex of stirred water, alcohol pre-wetting, protection from air (oxygen), preparation of stock solutions from fresh rather than salt water, or the like, as is known for such polymers.

CROSSLINKING AGENTS

The crosslinking agents are multivalent (polyvalent) metal cations which are effective for gelling the selected polymer when the aqueous admixture is within the pH gelation range. Polyvalent metal ions preferably are one or more of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$. Presently preferred are $Al^{3+}$ and $Cr^{3+}$; although $Cr^{3+}$ is presently preferred in high brines.

The polyvalent metal ions are employed in the form of compounds or complexes with an effective sequestering or chelating amount of one or more chelating or sequestering anions. The chelating or sequestering anions typically are one or more of acetate, nitrilotriacetate, tartrate, citrate, tripolyphosphate, metaphosphate, gluconate, phosphate, and the like, including mixtures thereof. The chelating or sequestering agent retards the onset and rate of gelation of the polymer. Presently preferred is citrate.

The solution of polyvalent metal cation is prepared from a suitable water-soluble compound of the metal, such as the sulfate, chloride, nitrate, acetate, and the like, by admixing the metal compound with sufficient amounts of water to make up a desired or convenient stock solution concentration such as about 1 to 5 weight percent of polyvalent metal compound. Fresh water is preferred for best solubility characteristics.

The sequestering agent usually is supplied or available as the sodium salt, or in some cases as the free acid. A stock solution is made up in water, preferably fresh water, to a convenient concentration, such as about 1 to 5 weight percent of sequestering agent.

The polyvalent metal salt solution and the sequestering agent solution then are admixed in suitable proportions to result in the desired sequestered polyvalent metal cation solution. The amount of chelating or sequestering anion employed presently preferably is sufficient to substantially associate with the polyvalent metal cation present in the solution. Generally, the molar ratio of polyvalent metal cation to sequestering anion varies over the broad range of about 1:1 to 6:1, preferably about 2:1 to 4:1, and presently most preferably about 2.5:1 to 3.5:1.

Conveniently, the polymer can be dispersed in a given amount of water, preferably fresh water, and to it then added the desired amounts of a solution or dispersion of the sequestered polyvalent metal cation crosslinking agent. The amount of crosslinking agent used depends largely on the amounts of polymer solution. Lesser amounts of polymer require lesser amounts of crosslinking agent, and vice-versa. Further, it has been found that for a given concentration of polymer that increasing the amount of crosslinking agent generally substantially increases the rate of crosslinking. Generally, the ratio of polyvalent metal cations to crosslinkable side groups of the polymeric viscosifier will vary over the broad range of about 10:1 to 1:10, preferably about 5:1 to 1:1.

After admixing with the aqueous solution of the crosslinking agent, the polymer concentration generally will be on the order of about 500 to 10,000 ppm, more usually about 1,000 to 2,500 ppm.

COMPOSITIONS FOR INJECTION

The pre-injection pH of the gelable compositions prepared for injection is critical in order to achieve effective plugging of the underground formation. The thickened aqueous compositions prepared at the surface exhibit pH values of about 7.5 or above. The effective amount of carbon dioxide subsequently added thereto, below ground, gradually, under the conditions of heat and pressure existing in the strata, fingers effectively into the injected gelable composition to lower its pH into the gelation pH range, thus triggering gelation deep in the permeable strata.

AMOUNT OF IN-SITU GELABLE COMPOSITION

The total quantity of in-situ-gelable aqueous treating composition employed can be expressed in terms of the pore volume of the stratum area to be treated. For example, if a region (one or more stratum or portion thereof) to be treated is taking upwards of perhaps about 80 volume percent of the injected fluid, a packer can be set to direct the treating composition into this zone. The quantity of treating composition can vary widely, depending on the effects desired, but generally in the range of about 100% to 120% of the pore volume of the zone to be treated with the upper limit being governed mainly by the practical limitations of pumping expense and chemical costs.

CARBON DIOXIDE

As the next step, in our invention, after injection of the gelable composition, i.e., the thickened aqueous composition admixture, into the heterogeneous subterranean formation, carbon dioxide is injected.

The highly mobile carbon dioxide fingers preferentially into the highly permeable strata, becomes admixed therein with the previously placed gelable composition, dissolves in the water, lowers the pH into the pH gelation range, resulting in gel formation.

The carbon dioxide can be conveniently employed as a gas, suitably compressed to overcome necessary downhole back pressure injection requirements. Alternatively, the carbon dioxide can be employed and injected as a liquid under suitable temperature and pressure control. Injection as a liquid into relatively hot formations may at times be desirable, since heat of vaporization can be readily obtained from the formation.

Carbon dioxide can be employed in gaseous admixture with such as nitrogen, steam, or mixtures thereof, if desired or convenient depending on the available source of the carbon dioxide. Carbon dioxide can be employed as saturated or super saturated admixtures with water. Steam generators can be employed wherein the fuel and air are combusted and the gases then used for injection purposes. Once-through steam generators also can be used since the product therefrom is an admixture primarily of steam, carbon dioxide, and nitrogen.

In some areas, carbon dioxide or carbon dioxide-containing gases are available from such as $CO_2$-producing wells, $CO_2$-natural gas admixtures from which the natural gas is separated leaving available the $CO_2$, stack gases, and the like.

The amount of carbon dioxide to employ is that amount needed to effect the necessary pH adjustment resulting in the degree of in-situ gel formation and flow impedance desired. This depends on the pH gelation range of the gel-forming materials chosen, i.e., the polymer(s) and polyvalent metal ion(s). Above-ground tests on the gelation admixture, i.e., the thickened aqueous composition, can be readily made by injecting $CO_2$ into a sample and monitoring the gelation pH and the $CO_2$ requirements. Additionally, or more generally in actual practice, reliance is placed on monitoring back-pressure and injection-resistance requirements down-hole so as to judge appropriate cessation of carbon dioxide injection.

Since carbon dioxide is at least partially water-soluble, and such water solubility tends to increase with increasing pressures, it is expected that at high reservoir pressures the carbon dioxide may be somewhat slow in initially propagating outwardly into the formation because of dissolution, at least until connate water reservoir pressure demands are satisfied.

The injected carbon dioxide tends to flow in a fingering fashion and flows most readily through the zones of relatively high permeability and thus contacting the in-place thickened aqueous slug in zones where most needed.

It presently is preferred to use an inert and less soluble carrier gas, such as nitrogen, so that the injected gas phase can propagate itself further outwardly into the reservoir and into the placed gelable-solution admixture. With such a carrier gas, it is believed that the otherwise somewhat adverse mobility ratio of the carbon dioxide alone is improved and this improves formation of an maintenance of an extended gelled band in the (now-less) permeable zone(s).

SUBSEQUENT DE-GELATION

It sometimes is desirable to plug a portion of an underground formation so as to divert subsequently injected treating fluids into certain zones of the formation and yet be able to remove the stoppages from the formation after the particular treatment is completed. Gel-forming compositions are advantageous, since gel-breaking can be accomplished, when desired, by appropriate subsequent treatment.

The plug can be substantially reduced or eliminated following the gelation at any time convenient thereafter by injecting an agent such as sodium hypochlorite which is recognized in the art for its effectiveness in degrading polymeric viscosifiers such as the polyacrylamides, which upon contacting the gel-plug in the formation gradually causes dissolution thereof.

PREFLUSH (OPTIONAL)

Prior to employment of the gelable compositions, the strata can be subjected to a conditioning preflush step.

The optional preflush employs an aqueous solution with a lower level of hardness (calcium and magnesium ions) and/or total dissolved solids (tds) than that of the stratum connate water, and preferably containing substantially no hardness cations though it may be saline. The purpose of the preflush is to alter the salinity of the connate water by flushing the formation, generally with about one to three times the pore volume of the zone to be treated.

Since it is known that enhanced oil recovery chemicals such as surfactants and polymeric viscosifiers are adsorbed and/or precipitated to a greater extent in the presence of electrolytes and hardness cations in particular, the preflush alleviates this potential problem by sweeping out at least a fraction of such electrolytes. A typical NaCl preflush brine contains, e.g., on the order of about 0.2 to 2 weight percent total dissolved solids.

Sodium chloride is the generally preferred salt although other sodium salts such as the nitrate, sulfate, acetate, and the like, are suitable. It is contemplated that even more concentrated salt solutions can be used for preflushing provided that no incompatibility results with the dissolved polymeric viscosifier such as said polyacrylamide.

The preflush may contain polymeric thickeners such as partially hydrolyzed polyacrylamides and conventional sacrificial agents such as sodium carbonate, sodium polyphosphate, and the like. Such a preflush slug possesses better mobility control than an unthickened preflush slug and improves sweep efficiency by contacting, e.g., areas unswept by water used in any previous waterflooding. Heterogeneous zones of varied and higher salinity would thusly be modified on the average to a lower salinity range more suitable for practicing the instant process.

AQUEOUS DRIVE FLUID

An aqueous drive generally follows the permeability contrast correction process of our invention. The aqueous drive employs available field brines and/or fresh water if the latter is available.

The aqueous drive, since it follows our in-situ gelation treatment, is diverted to the formerly relatively less permeable but still oil-rich zones since the permeability contrast correction process slows or substantially prevents the flow of aqueous drive fluid through the formerly more permeable but now oil-poor zones (so-called thief zones). A successful permeability contrast correction operation generally is signaled at the production well by a reduction of the water/oil ratio in the produced fluid.

Subsequent to the permeability contrast correction, the water/oil ratio may gradually increase again after prolonged injection of the drive water. A gelation retreatment of the formation can be considered appropriate, if desired.

These gel-plugging techniques also are useful during well workovers, in fracture treatments, and to correct the injection profile of a well by in depth sealing of communicating streaks of relatively high permeability so that flooding fluids will enter the formation in a more useful front profile.

EXAMPLES

Examples are provided in order to assist one skilled in the art to a further understanding of the invention. Particular species employed, exemplary facets, equipment, and the like, are designed to be further illustrative of the invention and not limitative of the reasonable scope thereof. The ratios of permeabilities (permeability contrast) in packs used in the examples was about 8-10 for Ottawa sand and about 5.8 for beads. The use of the term "fresh water" in the Examples indicates the use of Bartlesville tap water (BTW) or synthetic generator water (SGW). These "waters" were found to be essentially equivalent throughout the experimental work. The synthetic generator water was prepared by adding the following salts to 5 gallons (18.93 liters) of distilled waters:

| | |
|---|---|
| $NaHCO_3$ | 6.35 g |
| NaCl | 2.35 g |
| $Na_2CO_3$ | 0.65 g |
| $CaCl_2$ (anhydrous) | 0.27 g |
| $MgCl_2$ (anhydrous) | 0.23 g |

EXAMPLE I

This run demonstrates the feasibility of employing carbon dioxide to alter the pH of aqueous solutions. This run further demonstrates that the passage of gaseous $CO_2$ through an aqueous alkaline mixture is effective to trigger the bulk gelation of an aluminum citrate/polyacrylamide permeability contrast correction solution. Such a system is known to gel over the pH range of 3 to 7. The $CO_2$ effectively reduced to pH of the mixture into the gelation range.

An aqueous aluminum citrate solution was prepared by mixing equal volumes of aluminum sulfate and sodium citrate stock solutions. The aluminum sulfate stock solution was prepared by dissolving 3.75 grams of $Al_2(SO_4)_3.18H_2O$ in sufficient distilled water to give 100 grams of solution (3.75 weight percent based on the aluminum sulfate 18-hydrate; approximately 0.11 molar in $Al^{3+}$). The sodium citrate stock solution was prepared by dissolving 1.1 grams of $Na_3C_6H_5O_7.2H_2O$ in sufficient distilled water to give 100 grams of solution (1.1 weight percent based on the sodium citrate 2-hydrate; approximately 0.037 molar in citrate). The molar ratio of aluminum to citrate in the thusly prepared mixture was about 3:1. The pH of the diluted mixture was adjusted to about 8.5 by the addition of dilute (8 weight percent) aqueous sodium hydroxide. To the pH adjusted solution was added about 100 g of an aqueous 5,000 ppm polyacrylamide solution (HF 1031 manufactured by Hercules Inc., and characterized as a very high molecular weight polyacrylamide, with 20-30% hydrolyzable groups). The so-prepared permeability contrast correction slug contained 2,500 ppm polyacrylamide, and was about 0.055M $Al^{3+}$ and about 0.0185M citrate. After this addition of the aqueous polyacrylamide, the pH of the solution remained at about 8.5 and there was no evidence of gelation or precipitation.

On the passage of gaseous $CO_2$ through this mixture, the pH was lowered to about 6.3 and gelation became evident within 10 minutes.

EXAMPLE II

This run demonstrates that our inventive process effectively "corrected the permeability" of a heterogeneous substrate simulated by a glass bead-packed tube containing zones of small diameter beads (low permeability zone) and coarse Ottawa sand (high permeability zone).

A sand zone was positioned centrally in a concentric tube system by placing the sand in the smaller of the two concentric tubes and then packing the annular space between the two tubes with small glass beads (105-210μ diameter). The inner tube was then withdrawn. The glass beads were obtained from the Cataphate Division of the Ferro Corporation. The permeability of the centrally positioned sand zone was approximately 9-10 times that of the peripheral zone of glass beads.

An aqueous polyacrylamide solution was prepared in Bartlesville tap water to contain 5,000 ppm polyacrylamide (HF 1031). An aqueous aluminum citrate solution was prepared by the procedure described in Example I to give a solution which was 0.11 molar in $Al^{3+}$ and 0.037 molar in citrate. The pH of the aluminum citrate solution was adjusted to about 8.5 with aqueous NaOH (8 weight percent) before it was mixed with the polyacrylamide solution.

A permeability contrast correction liquid slug was prepared by mixing equal volumes of aqueous polyacrylamide (5,000 ppm) with the pH-adjusted aqueous aluminum citrate solution, so that the slug contained 2,500 ppm of polyacrylamide, and was 0.055M $Al^{3+}$ and 0.0185M citrate. The gelable thickened solution was colored red with a water-soluble dye. Approximately 0.5 PV of the red-colored composition was passed into the "core". Then, $CO_2$ was passed into the packed tube until gas break-through occurred, and the apparatus was closed in with $CO_2$ at 70 psi for 10 minutes. The pressure was released, and the $CO_2$ procedure was repeated including shut-in. Thereafter, one pore volume of fresh water was injected. The run was completed by injecting another pore volume of fresh water colored with a water-soluble yellow dye.

In order to verify the effectiveness of our inventive process to "correct permeability" in the simulated heterogeneous matrix, the "core" material was sectioned at one-half inch intervals and the cross-sectional areas were examined. The central zone (high permeability) was red in appearance showing the presence of polyacrylamide gelled with aluminum citrate. The peripheral zone (low permeability) was yellow in appearance showing that the final pore volume of fresh water (colored with the yellow dye) was diverted to the less permeable peripheral glass bead zone.

Figure 3:
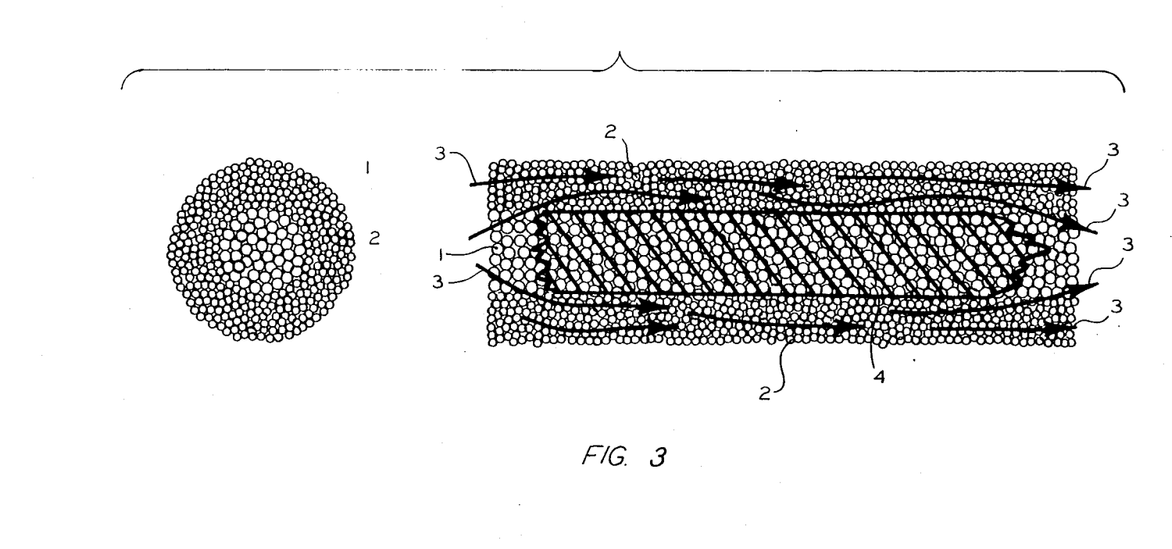

Thus, it was clearly demonstrated that the initially injected ungelled thickened aqueous slug passed predominantly into the centrally positioned high permeability sand zone where gelation was triggered by the subsequently injected $CO_2$ slug which fingered through the high permeability streak to lower the pH therein into the gelation pH range of 3 to 7. The subsequently injected yellow-colored drive fluid was diverted into the lower permeability glass bead zone. FIG. 3 depicts the diversion of the aqueous drive slug through the lower permeability glass beads.

EXAMPLE III

This run was carried out in essentially the same manner and in the same apparatus as the run described in Example II, except that glass beads were used to simulate the zones of both high and low permeability. The centrally positioned glass beads (simulating a high permeability streak) had diameters in the range of 105–210$\mu$, and the peripherally locally glass beads (simulating a low permeability zone) had diameters in the range of 53–105$\mu$. The glass beads used were obtained from the Cataphate Division of the Ferro Corporation.

Observations and conclusions were similar to those disclosed in Example II. A longitudinal section of the "core" material was examined in this run. FIG. 3 depicts the diversion of the aqueous drive slug through the lower permeability glass beads.

EXAMPLE IV

This run demonstrates that merely the initial injection of an aqueous polyacrylamide slug (without the inventive in-situ gelation step) into the simulated heterogeneous matrix, using the sand/glass bead-packed concentric tube apparatus as described in Example II, failed to effectively divert the subsequently injected overflush water slug.

A 0.5 PV slug of a 2,500 ppm solution of polyacrylamide was injected followed by an overflush treatment consisting of two consecutive one-pore volumes of fresh water, the last slug of which was colored with a yellow dye.

Figure 1:
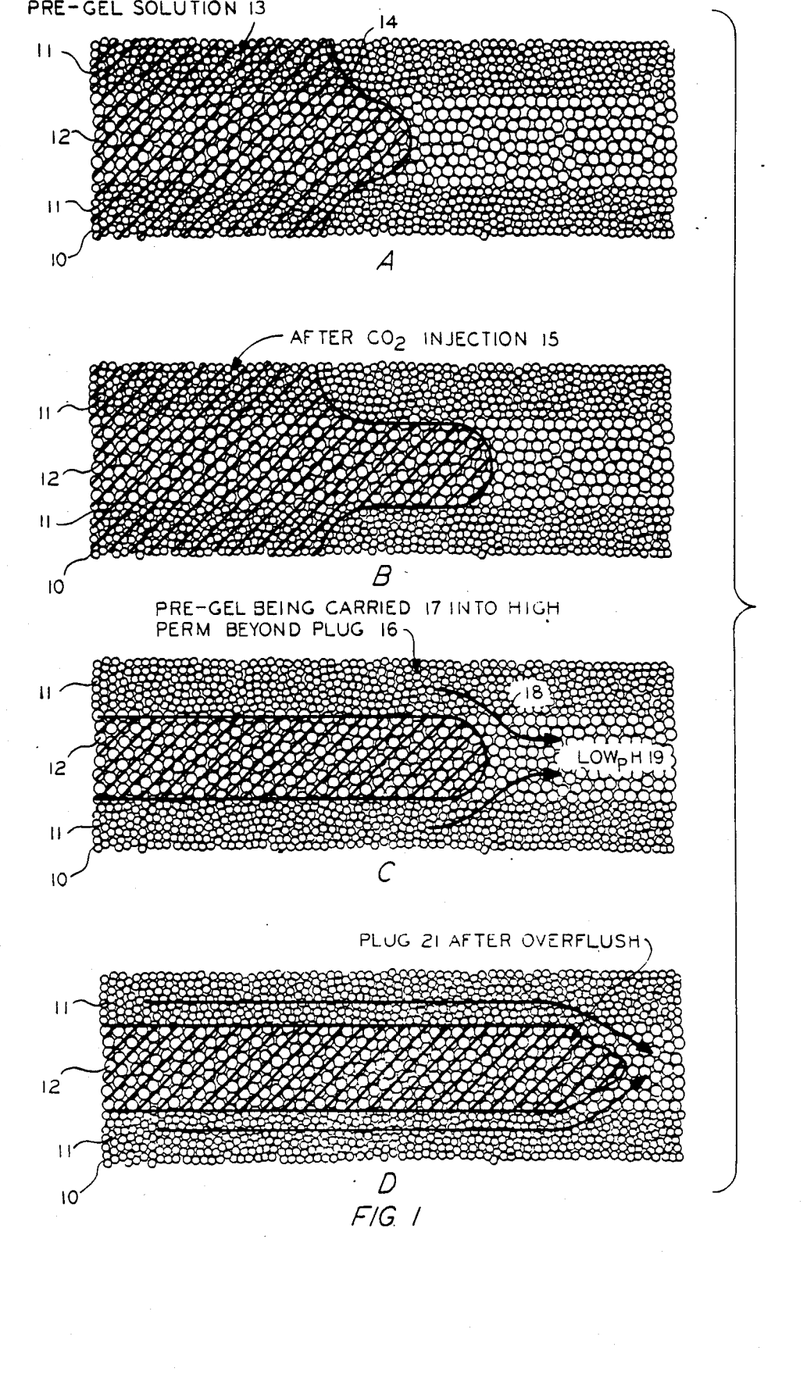
FIG. 1 illustrates by means of a series of drawings A, B, C, and D a pictorial sequence of gel placement. The well bore face is indicated by 10.
Figure 2:
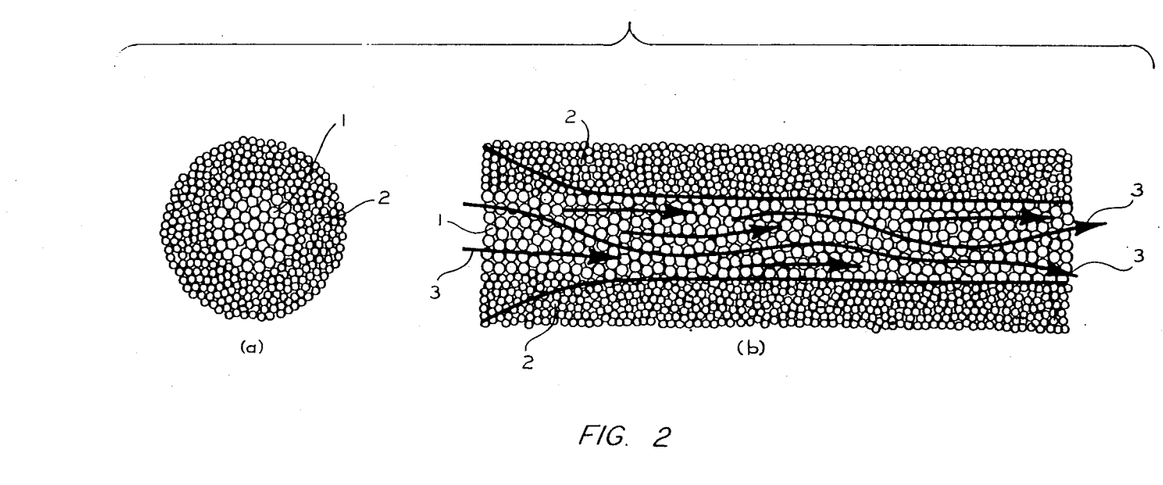
FIG. 2 illustrates (a) cross-section and (b) longitudinal views of a simulated sand pack prepared with an internal core 1 of fine glass beads surrounded by 2 slightly larger glass beads. The simulated sand pack shown split longitudinally illustrates by flow arrows 3 the tendency of a liquid to flow in the more permeable inner core of coarse beads as the path of relative least-resistance.

After completion of the run, the core material was sliced longitudinally and the centrally located Ottawa and zone was seen to be yellow in color. Thus, it was shown that the initially injected polymer solution was ineffective in decreasing the water permeability of the central sand packed zone. Had the polymer slug effected a significant permeability correction, the yellow-colored overflush slug and would have been diverted and the peripheral zone of the core material (lower permeability zone) would have appeared yellow in color. FIG. 2 depicts the preferential passage of all injected fluids through the centrally positioned high permeability sand zone.

EXAMPLE V

The operability of the present invention was further demonstrated by the use of parallel tubes packed, respectively, with large diameter glass beads (simulating high permeability zone) and small diameter glass beads (simulating low-permeability zone). The coarse grade glass beads and fine grade glass beads had diameters, respectively, of 105–210$\mu$ and 44–74$\mu$.

The permeability contrast correction slug employed was prepared as described in Example II. A volume of the slug was placed in a reservoir vessel and pumped into the parallel glass bead packed tubes. During the injection of the aluminum citrate/polyacrylamide slug, 90 mL of liquid was displaced through the coarse beads and 35 mL of liquid was displaced through the fine beads. Carbon dioxide then was injected until gas breakthrough was noted through the coarse bead pack. During the $CO_2$ injection, 10 mL of fluid was displaced from the coarse bead pack and only 2.5 mL of fluid was displaced from the fine bead pack.

This was followed by a fresh water overflush treatment with green-dyed water. During the overflush treatment, only 85 mL of liquid was displaced in the coarse glass bead pack, whereas 286 mL of liquid was displaced from the tube containing the fine glass beads.

The relative amounts of liquid displaced from the coarse bead and fine bead packs before and after the permeability correction treatment clearly demonstrate and further verify the effectiveness of our inventive process. The coarse (permeable) path was dominantly red in color, while the fine pack (less permeable) was dominantly green after the overflush. From the foregoing data, it is evident that overflush liquid was diverted from the coarse glass bead pack to the relatively less permeable fine glass bead pack.

EXAMPLE VI

Figure 5:
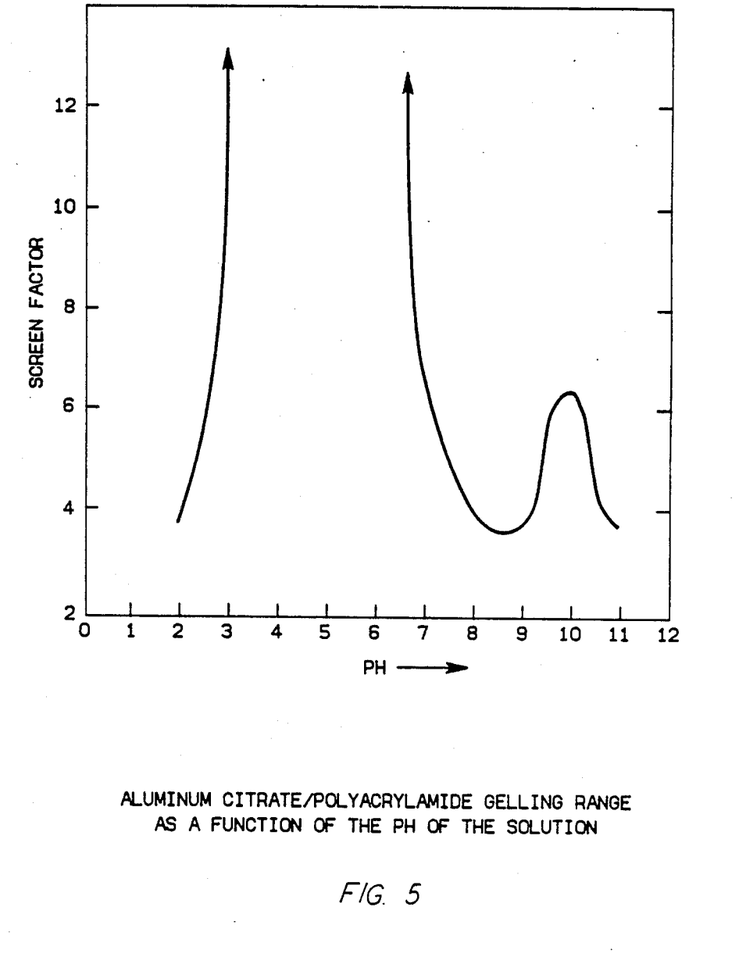
FIG. 5 illustrates the gelation of a polymer solution, exemplified by an aluminum citrate/polyacrylamide solution, as a function of pH, illustrating the dramatic gelling occurring within a pH range of about 3 to 7.

The attached FIG. 5 reflects a summary of data illustrating the pH gelling range for a polyacrylamide/aluminum citrate system.

In order to show the effect of changes in pH on the crosslinking behavior of an aluminum citrate system containing an aluminum/citrate molar ratio of 1.6:1, solution samples were characterized by measurement of screen factors.

Screen factor is the ratio of time periods required for a specified volume of a solution to pass through five 100-mesh stainless steel screens in a viscometer as compared to the time required for the passage of an equal volume of pure solvent through the screens.

For the graph shown in FIG. 5, the solvent employed was brine (NaCl) and the test solutions contained aluminum cations sequestered with citrate anions (molar ratio of aluminum to citrate 1.6:1) and polyacrylamide in aqueous salt brine media with pH adjusted over the range of 2 to 11.

A 1,200 ppm brine solvent passed through the viscometer in about 7 seconds, and a 250 ppm solution of polyacrylamide (Dow Pusher 700) in 1,200 ppm brine passed through in about 52.5 seconds, thus giving a screen factor of about 7.5 (52.5 sec/7.0 sec).

Sample mixtures of aluminum citrate and of polyacrylamide were formulated over a range of pH values (2 to 11) and then individually passed through the viscometer. Magnitude of the screen factors observed were taken as a direct indicator of any crosslinking which had occurred in the sample, e.g., the greater the screen factor, the more extensive was the crosslinking.

FIG. 5 shows that the screen factor peaks in the ranges of pH 3 to 7 and from 9 to 10 but for practical purposes, the effective gelation (crosslinking) pH range was 3 to 7 since the peak in the pH range of 9 to 10 is so much smaller.

EXAMPLE VII

This Example demonstrates that the initial injection of an aqueous $Na_2CO_3$ slug into the bead pack can further delay the gelation of the subsequently injected gelable composition. The experiment was carried out in essentially the same fashion as described in Example II except for the injection of 2 mL of a 1 weight percent aqueous sodium carbonate slug prior to the subsequent sequential "injection of 70 mL of the aluminum citrate/polymer slug (colored with red dye), carbon dioxide and 90 mL of fresh water (colored with yellow dye). Longitudinal sectioning of the bead pack after completion of the run showed that the red-colored gelled polymer was localized in the centrally positioned high permeability streak (large diameter beads) but farther from the injection port than observed in Example II.

Figure 4:
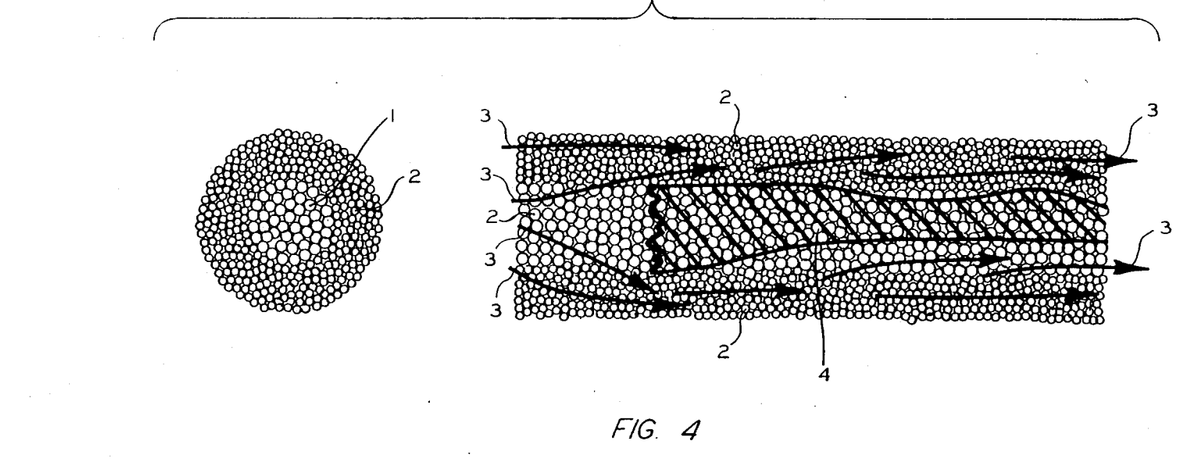
FIG. 4 illustrates a further run similar to FIG. 3, with the gel spaced or placed outwardly somewhat.

This Example illustrates that the inventive process can be controlled to effect permeability contrast correction deeper in the formation by using an initial injection of an alkaline slug such as aqueous $Na_2CO_3$ to raise the pH near the well-bore to a pH level above the pH gelation range. The gelation-triggering agent, i.e., the acidic $CO_2$, is thereby neutralized near the well-bore and becomes effective for triggering gelation at a greater distance from the well-bore. FIG. 4 depicts the positioning of the gelled composition in the high permeability zone but deeper in the formation. FIG. 3 depicts the result of the inventive process without the prior injection of $Na_2CO_3$.

The disclosure, including data, has illustrated the value and effectiveness of our invention. The examples, the knowledge and background of the field of the invention and the general principles of chemistry and of other applicable sciences have formed the bases from which the broad descriptions of our invention including the ranges of conditions and the generic groups of operant components have been developed, and formed the bases for our claims here appended.

We claim:

1. A gelable composition comprising effective ratios of:
    (a) water,
    (b) at least one polymer capable of gelling with a crosslinking agent within a gelation pH range,
    (c) at least one polyvalent metal cation, selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, $Cr^{3+}$, and mixtures thereof;
    (d) at least one chelating/sequestering anion selected from the group consisting of acetate, nitrolotriacetate, tartrate, citrate, tripolyphosphate, metaphosphate, gluconate, phosphate, and mixtures thereof, and
    (e) carbon dioxide.

2. The composition of claim 1 wherein said polymer is selected from the groups consisting of biopolysaccharides, cellulose ethers partially hydrolyzed polyacrylamides, acrylamide-based polymer, partially hydrolyzed polyacrylonitriles, polystyrene sulfonates, lignosulfonates, methylolated polyacrylamides, and mixtures.

3. The composition of claim 1 employing a range of about 10:1 to 1:10 molar ratio of polyvalent metal cation to crosslinkable groups of said polymer; and a molar ratio of about 1:1 to 6:1 polyvalent metal cation:sequestering agent.

4. The composition of claim 3 wherein said polymer comprises polyacrylamide, said polyvalent metal cation comprises $Al^{3+}$, and said chelating/sequestering anion comprises citrate.

5. The composition of claim 4 wherein said polymer is present in said gelable composition in an amount of about 500 to 10,000 ppm.

6. A gel composition comprising effective gelation ratios of:
    (a) water,
    (b) a polymer capable of gelling with a crosslinking agent at a pH in the range of 3 to 7,
    (c) a crosslinking agent comprised of sequestered polyvalent metal cations selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$,
    (d) chelating/sequestering anions selected from the group consisting of acetate, nitrilotriacetate, tartrate, citrate, tripolyphosphate, metaphosphate, gluconate, phosphate, and mixtures thereof, and
    (e) carbon dioxide.

7. The gel composition of claim 6 employing a molar ratio of about 10:1 to 1:10 of said multivalent cation polyvalent metal cation:crosslinkable groups of said polymer; and said polyvalent metal cation/sequestering anion in a molar ratio of about 1:1 to 6:1 polyvalent metal cation:sequestering anion.

8. The gel composition of claim 6 wherein the polymer is present in said gel composition in an amount of about 500 to 10,000 ppm.

9. The gel composition of claim 7 wherein said polymer is selected from the group consisting of biopolysaccharides, cellulose ethers, partially hydrolyzed polyacrylamides, acrylamide-based polymers, partially hydrolyzed polyacrylonitriles, polystyrene sulfonates, lignosulfonates, methylolated polyacrylamides, and mixtures.

10. A gelable composition comprising effective ratios of:
    (a) water;
    (b) at least one polymer capable of gelling with a crosslinking agent within a gelation pH range;
    (c) at least one polyvalent metal cation, selected from the group consisting of $Fe^{2+}$, $Fe^{3+}$, $Al^{3+}$, $Tl^{4+}$, $Zn^{2+}$, $Sn^{4+}$, $Ca^{2+}$, $Mg^{2+}$, $Cr^{3+}$, and mixtures thereof;
    (d) at least one chelating/sequestering anion selected from the group consisting of acetate, nitrolotriacetate, tartrate, citrate, tripolyphosphate metaphosphate, gluconate, phosphate, and mixtures thereof.

* * * * *